United States Patent [19]

Van Lammeren et al.

[11] Patent Number: 4,933,749
[45] Date of Patent: Jun. 12, 1990

[54] COLOR TELEVISION STANDARD IDENTIFICATION CIRCUIT

[75] Inventors: Johannes P. M. Van Lammeren; Armand M. Stuivenwold; Henricus T. P. J. Van Elk; Bruno P. J. M. Motté, all of Nijmegen, Netherlands

[73] Assignee: U.S. Philips Corporation, New York, N.Y.

[21] Appl. No.: 310,792

[22] Filed: Feb. 14, 1989

[30] Foreign Application Priority Data

Mar. 7, 1988 [NL] Netherlands .................. 8800557

[51] Int. Cl.⁵ .................... H04N 9/66; H04N 5/455
[52] U.S. Cl. .................................... 358/23; 358/24; 358/11
[58] Field of Search ............... 358/11, 23, 24, 191.1, 358/18

[56] References Cited

U.S. PATENT DOCUMENTS

| | | | |
|---|---|---|---|
| 3,839,649 | 10/1974 | Morio | 358/24 |
| 4,148,058 | 4/1979 | Harwood et al. | 358/24 |
| 4,644,388 | 2/1987 | Douziech et al. | 358/24 |
| 4,686,560 | 8/1987 | Balaban et al. | 358/23 |
| 4,739,390 | 4/1988 | Achiha et al. | 358/11 |

FOREIGN PATENT DOCUMENTS

| | | | |
|---|---|---|---|
| 0004445 | 10/1979 | European Pat. Off. | 358/24 |
| 0156096 | 9/1984 | Japan | 358/11 |

OTHER PUBLICATIONS

Figures 2, 3:
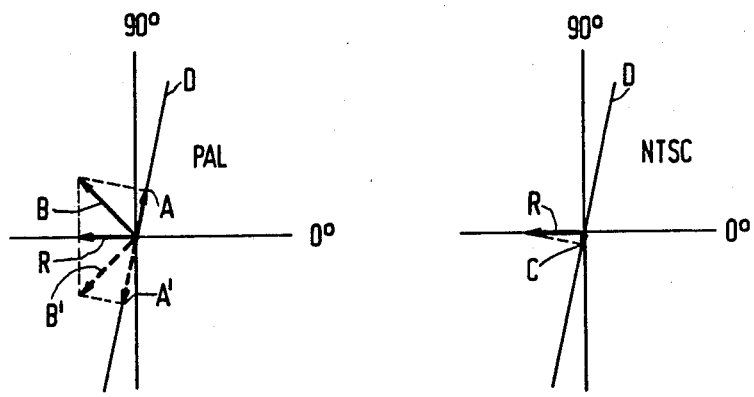

IEEE Transactions on Consumer Electronics, vol. CE-31, No. 3, Aug. 85, pp. 147–155, IEEE, N.Y., U.S.A.; A. Pery et al.: "A Fully Automatic Multistandard TV Chrominance Decoder"; FIGS. 2, 5.

Primary Examiner—Tommy P. Chin
Assistant Examiner—James Juo
Attorney, Agent, or Firm—Edward W. Goodman

[57] ABSTRACT

Figure 1:
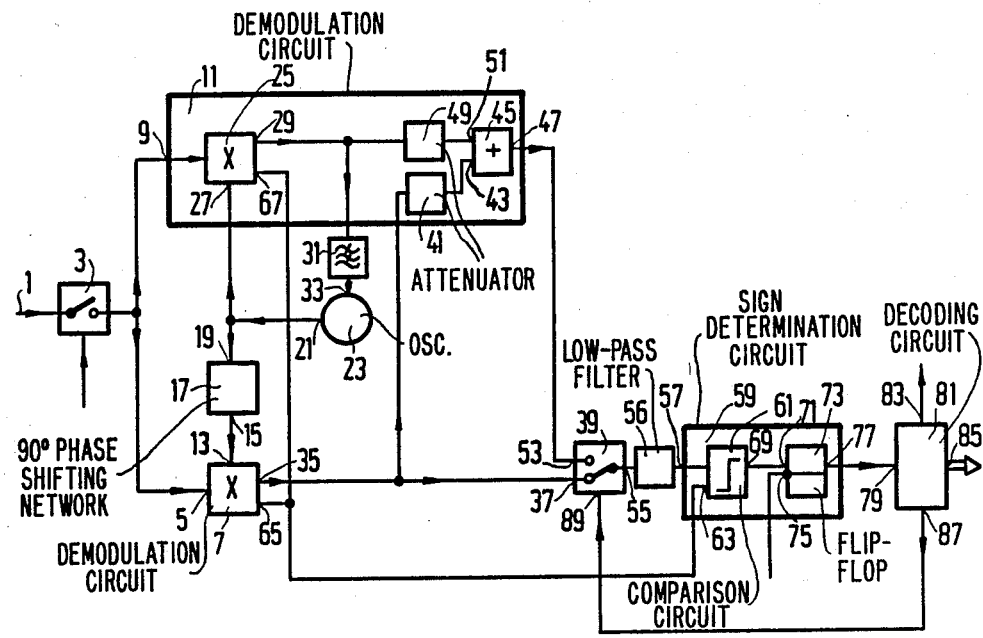

A PAL-NTSC color television standard identification circuit, comprising a first demodulation circuit (7) for a reference component and a second demodulation circuit (11) for a possible color identification component of a color synchronizing signal, can perform a reliable identification by means of a digital decoding circuit (81) for the output signals of the demodulation circuits if the second demodulation circuit (11) is adapted (41, 45, 49) to demodulate along an axis slightly differing from the axis of the color identification component (FIG. 1).

3 Claims, 1 Drawing Sheet

COLOR TELEVISION STANDARD IDENTIFICATION CIRCUIT

The invention relates to a color television standard identification circuit for distinguishing at least a PAL and an NTSC color television signal, said circuit comprising a first demodulation circuit for demodulating a reference component of a color synchronizing signal occurring in both PAL and NTSC and a second demodulation circuit for demodulating a color identification component of the color synchronizing signal occurring only in PAL, and a decoding circuit for determining by means of output signals of the first and the second demodulation circuit whether the color synchronizing signal is a PAL or an NTSC color synchronizing signal.

A color television standard identification circuit of the type described above is known from IEEE Transactions on Consumer Electronics, Vol. CE 31, No. 3, August 1985, pp. 147–155. The greater part of this circuit is incorporated in an integrated circuit to which two capacitors performing a memory function in the decoding circuit must be connected.

It is an object of the invention to obviate as much as possible the use of capacitors to be connected externally.

According to the invention, a color television standard identification circuit of the type described in the opening paragraph is therefore characterized in that a sign determination circuit is arranged between an output of the demodulation circuits and an input of the decoding circuit, said sign determination circuit comprising a comparison circuit whose sign reversal level is substantially equal to the rest level of the demodulation circuits and further comprising a sampling circuit, the second demodulation circuit being adapted to demodulate the color synchronizing signal at an axis slightly differing from the axis of the color identification component in such a way that the sign determination circuit cannot determine an incorrect sign during demodulation of an NTSC color synchronizing signal.

It is to be noted that the use of a sign determination circuit with a comparison circuit and a sampling circuit for obtaining a decoding circuit no longer requiring capacitors is known from French Patent Application FR-A 2,575,353 for identifying a color difference signal associated with a given line period in a SECAM receiver.

It has been found that it is insufficient to incorporate a sign determination circuit, for example, after the demodulation circuits of a color television standard identification circuit.

To obtain a reliable standard identification, it is necessary that the second demodulation circuit supplies a signal from which the sign determination circuit can obtain such a signal that the decoding circuit can make a distinction between noise and the presence of an NTSC color synchronizing signal.

If the second demodulation circuit had a demodulation axis which would completely coincide with the phase of the PAL color identification component, it would supply an output signal which would be equal to the rest level of the second demodulation circuit in the case of demodulation of an NTSC color synchronizing signal. With a slight internal shift of its comparison level, its own noise could then cause the sign determination circuit to supply a signal which would not correspond to the sign desired for the rest level of the second demodulation circuit. This is prevented by slightly modifying the demodulation axis of the second demodulation circuit.

The invention will now be described in greater detail, by way of example, with reference to the accompanying drawing in which FIG. 1 is a block diagram of a color television standard identification circuit according to the invention, FIG. 2 is a phasor diagram of the demodulation of the components of a PAL color synchronizing signal by means of a circuit according to FIG. 1, and FIG. 3 is a phasor diagram of the demodulation of the components of an NTSC color synchronizing signal by means of a circuit according to FIG. 1.

In FIG. 1 a chrominance signal is applied to an input 1, from which signal a gating circuit 3 selects the color synchronizing signal and passes it on to an input 5 of a first demodulation circuit 7 and to an input 9 of a second demodulation circuit 11.

The first demodulation circuit 7 is a first synchronous demodulator which receives a reference signal at a reference signal input 13 from an output 15 of a 90° phase-shifting network 17, which reference signal has a phase which is 90° shifted with respect to the phase of a reference signal occurring at an input 19 thereof and originating from an output 21 of an oscillator 23.

The input 9 of the second demodulation circuit 11 is also an input of a second synchronous demodulator 25, a reference signal input 27 of which is connected to the output 21 of the oscillator 23 and an output 29 of which applies, via a low-pass filter 31, a control signal to a control signal input 33 of the oscillator 23.

The oscillator 23, the second synchronous demodulator 25 and the low-pass filter 31 constitute a phase-locked loop controlling the phase of the reference signal at the reference signal input 27 of the second synchronous demodulator 25 in such a way that it differs ninety degrees from that of the reference component of the color synchronizing signal. As a result, the demodulated color identification component of the color synchronizing signal occurs at the output 29 of the second synchronous demodulator 25 in the case of synchronous demodulation of a PAL color synchronizing signal, whilst the phase-locked loop will control said output 29 substantially at its rest level in the case of synchronous demodulation of an NTSC color synchronizing signal.

The demodulation axis of the second synchronous demodulator 25 is the ninety-degree axis in FIGS. 2 and 3, and the demodulation axis of the first synchronous demodulator 7 is the zero axis. The reference component of the color synchronizing signal is denoted by R in the two Figures and has a phase of one hundred and eighty degrees. The PAL color synchronizing signal is denoted by B and B′ in FIG. 2, dependent on the line period in which it occurs.

In FIG. 1 an output 35 of the first synchronous demodulator 7 applies the demodulated reference component R of the color synchronizing signal, which has a negative polarity, to an input 37 of a change-over switch 39 and via an attenuator 41 to an input 43 of an adder circuit 45, an output 47 of which is also the output of the second demodulation circuit 11.

The output 29 of the second synchronous demodulator 25 applies the demodulated color identification component via a further attenuator 49 to a further input 51 of the adder circuit 45. The output 47 of the second demodulation circuit 11 now applies a demodulated color synchronizing signal to a further input 53 of the change-over switch 39, which signal is demodulated in accordance with an axis which is denoted by D in FIGS. 2 and 3 and which differs slightly from the ninety-degree axis. This difference is determined by the ratio of the attenuations of the attenuators 41 and 49.

FIGS. 2 and 3 show that in the case of PAL a slightly asymmetrical demodulation of the color identification component is effected with an amplitude A in the one line period and an amplitude A' in the next period, whilst in the case of NTSC a small negative amplitude C is demodulated by the second demodulation circuit 11.

In FIG. 1 an output 55 of the change-over switch 39 is connected to an input 57 of a sign determination circuit 59 via a low-pass filter 56 having an integration time of approximately half a microsecond. The input 57 is also an input of a comparison circuit 61, a reference level input 63 of which receives the rest level of the first and the second demodulation circuits 7, 11, which is symbolically indicated by a connection between this input 63 and a rest level output 65, 67 of the first and the second synchronous demodulator 7, 25, respectively.

An output 69 of the comparison circuit 61 is connected to a D input 71 of a D flip-flop 73 operating as a sampling circuit, a clock signal input 75 of which receives a pulse each time at the end of the occurrence of a color synchronizing signal. As a result, a logic value of one is obtained at an output 77 of the D flip-flop 73, which output is also the output of the sign determination circuit 59, if the signal at the input 57 of the sign determination circuit 59 was positive with respect to the reference level at the reference level input 63 of the comparison circuit 61, and a logic value of zero if the signal at the input 57 was negative with respect to this reference level.

The output 77 of the sign determination circuit 59 applies this logic one or logic zero signal to an input 79 of a decoding circuit 81 which supplies at an output 83 a switching signal of half the line frequency and the correct phase for switching the demodulation axis of a (R-Y) demodulator when a PAL signal is received, at an output combination 85 a signal combination which can bring a color television receiver comprising the color identification circuit to a PAL or NTSC receiving state, and at an output 87 a switching signal which can cause the change-over switch 39 to successively take up its two positions in a given receiving state of the receiver and which to this end is applied to a switching signal input 89 of the change-over switch 39.

The decoding circuit 81 compares the pattern of logic levels at its input 79 with a pattern to be expected in a given receiving state and a given state of the change-over switch 39, and with reference to the number of differences per period of time, for example, per field period it determines whether the receiving state of the receiver is the desired state, or whether no color information is received. This is effected by means of a counter which may be in the form of, for example a pseudo-random counter in order to obtain a small number of components.

The demodulation axis D, which is different from ninety degrees, of the second demodulation circuit 11 can now give a clear distinction between the pattern of logic levels occurring at the output 77 of the sign determination circuit due to a noise signal or due to an NTSC color synchronizing signal which occurs at the input 9 of the second demodulation circuit 11 when the change-over switch 39 is in the state not shown.

In the presence of an NTSC color synchronizing signal the negative amplitude C of the demodulated color synchronizing signal will cause the input 57 to be negative during the occurrence of the signal with respect to the rest level at the rest level input 63 so that the output 77 of the sign determination circuit always remains logic zero. In the presence of a noise signal, thus in the absence of a color synchronizing signal, the output 77 will, at an average, assume a logic zero level approximately as frequently as a logic one level.

If the demodulation axis of the second demodulation circuit 11 had been at ninety degrees, no distinction could be made because the own noise of the comparison circuit 61 could then cause the same logic signal pattern at the input 79 of the decoding circuit 81 in the presence of a noise signal as well as in the presence of an NTSC color synchronizing signal at the input 9 of the second demodulation circuit 11.

As can be seen in FIG. 2, a small difference from ninety degrees will cause a small asymmetry in a demodulated color identification component, which does not, however, introduce any change in the logic signal pattern at the input 79 of the decoding circuit 81.

If desired, the circuit may be extended by a section for identification of a SECAM color television signal, for example, by applying a frequency-demodulated SECAM color synchronizing signal to a third input of the change-over switch 39.

Capacitors are no longer required for the identification function, because this identification is now carried out in a digital signal processing section.

Instead of combining the output signals of the first and the second synchronous demodulator by means of the adder circuit 45, a third synchronous demodulator whose reference signal would have the desired phase D could be used in the second demodulation circuit 11.

The first and the second synchronous demodulators 7, 25 may also be used as color difference signal demodulators if the gating circuit 3 is omitted and if the demodulated color synchronizing signals are obtained from the output signals of the synchronous demodulators by means of gating circuits.

If desired, a sign determination circuit may be incorporated after each demodulation circuit and the change-over switch 39 may be omitted if the decoding circuit 81 is adapted to simultaneously process the output signals of the sign determination circuits.

Instead of using attenuators 41 and 49, the demodulators 7 and 25 may be formed in such a manner, for example, by choosing a certain ratio of currents supplied by current sources of multipliers in the form of synchronous demodulators, that the adder circuit 45 receives the correct amplitude ratio in the non-shown state of the change-over switch 39.

We claim:

1. A color television standard identification circuit for distinguishing at least a PAL and an NTSC color television signal, said identification circuit comprising a first demodulation circuit for demodulating a reference component (R) of a color synchronizing signal occurring in both PAL and NTSC, a second demodulation circuit for demodulating a color identification component of the color synchronizing signal occurring only in PAL, and a decoding circuit having an input coupled to respective outputs of said first and second demodulation circuits for determining whether the color synchronizing signal is a PAL or an NTSC color synchronizing signal, wherein said identification circuit further comprises a sign determination circuit coupled between the outputs of said first and second demodulation circuits and the input of said decoding circuit, said sign determination circuit comprising a comparison circuit having a comparison level, at which the level of an output signal of said comparison circuit changes, which is substantially equal to a reference level of said first and second demodulation circuits, and a sampling circuit having a input coupled to an output of said comparison circuit, an input of said sign determination circuit being coupled to an input of said comparison circuit and an output of said sign determination circuit being coupled to an output of said sampling circuit, wherein said second demodulation circuit is arranged to demodulate the color synchronizing signal at an axis slightly differing from the axis of the color identification component, whereby said sign determination circuit may accurately determine the correct sign of the output signal from said second demodulation circuit during demodulation of an NTSC color synchronizing signal by said second demodulation circuit.

2. A color television standard identification circuit as claimed in claim 1, wherein said first demodulation circuit comprises a first synchronous demodulator having an input and an output coupled, respectively, to an input and the output of said first demodulation circuit; and said second demodulation circuit comprises a second synchronous demodulator having an input coupled to an input of said second demodulation circuit, and an adder circuit having a first input coupled to the output of said first synchronous demodulator and a second input coupled to an output of said second synchronous demodulator, an output of said adder circuit being coupled to the output of said second demodulation circuit, and wherein said identification circuit further comprises an oscillator for supplying reference signals to reference signal inputs of said first and second synchronous demodulators, said oscillator having a control input coupled to the output of said second synchronous demodulator thereby forming a phase-locked loop for controlling the phase of said oscillator.

3. A color television standard identification circuit as claimed in claim 1 or 2, wherein a change-over switch is coupled between the input of said sign determination circuit and the outputs of said first and second demodulation circuits, respectively, said change-over switch having a switching signal input coupled to an output of said decoding circuit.

* * * * *